(12) United States Patent
Ouyang et al.

(10) Patent No.: US 12,505,506 B2
(45) Date of Patent: Dec. 23, 2025

(54) SUPER-RESOLUTION ULTRASONIC IMAGING METHOD AND ULTRASONIC IMAGING SYSTEM

(71) Applicant: SHENZHEN MINDRAY BIO-MEDICAL ELECTRONICS CO., LTD., Guangdong (CN)

(72) Inventors: Yali Ouyang, Shenzhen (CN); Maodong Sang, Shenzhen (CN); Lei Zhu, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 344 days.

(21) Appl. No.: 18/131,219

(22) Filed: Apr. 5, 2023

(65) Prior Publication Data

US 2023/0325976 A1 Oct. 12, 2023

(30) Foreign Application Priority Data

Apr. 8, 2022 (CN) .......................... 202220814154.4

(51) Int. Cl.
*G06T 3/4053* (2024.01)
*A61B 8/00* (2006.01)
(Continued)

(52) U.S. Cl.
CPC .............. *G06T 3/4053* (2013.01); *A61B 8/06* (2013.01); *A61B 8/0891* (2013.01); *A61B 8/481* (2013.01);
(Continued)

(58) Field of Classification Search
CPC ..... A61B 8/481; A61B 8/5207; A61B 8/0891; A61B 8/06; A61B 8/5223;
(Continued)

(56) References Cited

U.S. PATENT DOCUMENTS 11,083,435 B2 * 8/2021 Moshavegh ............ A61B 8/481
11,403,732 B2 * 8/2022 Jensen ................. G01S 15/8984
(Continued)

FOREIGN PATENT DOCUMENTS

CN 105232084 A 1/2016
CN 114668414 A * 6/2022
(Continued)

OTHER PUBLICATIONS

First Search dated Jun. 4, 2025, issued in related Chinese Application No. 202210369565.1 (3 pages).

*Primary Examiner* — John Villecco
(74) *Attorney, Agent, or Firm* — Sheppard Mullin Richter & Hampton LLP

(57) ABSTRACT

An ultrasonic imaging method includes: generating and displaying a first contrast enhanced image in real time under a normal contrast enhanced mode; switching from the normal contrast enhanced mode to a super-resolution contrast enhanced imaging mode, obtaining second ultrasonic echo signals to generate and display a second contrast enhanced image, and performing super-resolution data processing on the second ultrasonic echo signals to obtain a super-resolution image when displaying the second contrast enhanced image; and displaying the super-resolution image. The present disclosure can generate and display the second contrast enhanced image when collecting the ultrasonic echo signals used for super-resolution data processing, so that it is convenient for users to observe the current state of microbubble perfusion to enable the users to observe and compare the super-resolution image and the second contrast enhanced image, obtaining more diagnostic information.

18 Claims, 5 Drawing Sheets

(51) Int. Cl.
*A61B 8/06* (2006.01)
*A61B 8/08* (2006.01)
*G06F 3/14* (2006.01)

(52) U.S. Cl.
CPC .............. *A61B 8/5207* (2013.01); *G06F 3/14* (2013.01); *G06T 2207/10132* (2013.01); *G06T 2207/30104* (2013.01)

(58) Field of Classification Search
CPC .. A61N 2007/0039; G06T 2207/10132; G06T 2207/30101; G06T 3/4053; G06T 7/0012
See application file for complete search history.

(56) References Cited

U.S. PATENT DOCUMENTS

| | | | | |
|---|---|---|---|---|
| 12,150,813 | B2 * | 11/2024 | Pinton | G01S 15/899 |
| 12,190,473 | B2 * | 1/2025 | Yin | G06T 7/30 |
| 12,207,973 | B2 * | 1/2025 | Alizad | A61B 8/5207 |
| 2016/0106395 | A1 * | 4/2016 | Hynynen | A61B 8/0891 |
| | | | | 600/431 |
| 2016/0157828 | A1 * | 6/2016 | Sumi | G01N 29/46 |
| | | | | 702/189 |
| 2019/0015075 | A1 * | 1/2019 | Yoshiara | A61B 8/06 |
| 2019/0365355 | A1 * | 12/2019 | Eldar | A61B 8/488 |
| 2020/0121297 | A1 * | 4/2020 | Kim | A61B 8/5246 |
| 2020/0178939 | A1 * | 6/2020 | Song | A61B 8/5223 |
| 2020/0187910 | A1 * | 6/2020 | Pinton | A61B 8/085 |
| 2020/0229792 | A1 | 7/2020 | Moshavegh et al. | |
| 2020/0281571 | A1 * | 9/2020 | Luo | A61B 8/54 |
| 2021/0374910 | A1 * | 12/2021 | Song | G01S 15/89 |
| 2021/0407043 | A1 | 12/2021 | Jensen et al. | |
| 2022/0071596 | A1 * | 3/2022 | Wang | A61B 8/085 |
| 2022/0211350 | A1 * | 7/2022 | Pinton | G01S 15/899 |
| 2022/0240899 | A1 * | 8/2022 | Trzasko | G01S 7/52026 |
| 2022/0292637 | A1 * | 9/2022 | Huang | A61B 8/0891 |
| 2022/0386999 | A1 * | 12/2022 | Jensen | A61B 8/5276 |
| 2023/0000467 | A1 * | 1/2023 | Shi | G16H 30/40 |
| 2024/0099700 | A1 * | 3/2024 | Ouyang | A61B 8/5207 |
| 2024/0249384 | A1 * | 7/2024 | Eldar | A61B 8/5207 |
| 2024/0268793 | A1 * | 8/2024 | Jensen | G01S 7/52036 |
| 2025/0072871 | A1 * | 3/2025 | Kim | A61B 8/483 |
| 2025/0090143 | A1 | 3/2025 | Luo et al. | |

FOREIGN PATENT DOCUMENTS

| | | | |
|---|---|---|---|
| CN | 217219060 U | * | 8/2022 |
| JP | 2012-139441 A | | 7/2012 |
| WO | 2019/104468 A1 | | 6/2019 |

* cited by examiner

SUPER-RESOLUTION ULTRASONIC IMAGING METHOD AND ULTRASONIC IMAGING SYSTEM

CROSS-REFERENCE TO RELATED APPLICATIONS

This application is based on and claims priority to and benefits of Chinese Patent Application No. 202220814154.4, filed on Apr. 8, 2022. The entire content of the above-referenced application is incorporated herein by reference.

TECHNICAL FIELD

The present disclose relates to ultrasonic imaging, and more particularly to super-resolution ultrasonic imaging methods and ultrasonic imaging systems.

BACKGROUND OF THE INVENTION

As a new technology for real-time and dynamic observation of blood perfusion in lesions and tissues, contrast enhanced ultrasonic imaging (CEUS) plays an increasingly important role in the diagnosis of malignant diseases such as liver cancer, thyroid cancer and breast cancer, and has become a necessary examination method for clinical evaluation of blood circulation and perfusion.

However, due to the limitation of the diffraction limit of ultrasound in the far field, conventional clinical contrast enhanced ultrasound has limited ability to show the details of microvascular structure, and therefore it cannot distinguish tiny blood vessels with a diameter less than half a wavelength. Super-resolution contrast imaging is a new imaging method with ultra-high spatial resolution. By referring to the principle of fluorescence microscopic localization in optical super-resolution imaging, images with a spatial resolution of tens of microns can be obtained by locating and tracking isolated microbubbles. Therefore, the super-resolution contrast imaging technology is expected to solve the problem of microvascular display, and becomes a powerful tool to observe micro-blood flow, thereby becoming a hot spot in preclinical research in the fields of tumor, micro-blood perfusion in different tissues and organs, plaque neovascularization and so on. However, due to the long collection time of the original data of super resolution imaging, the large amount of data calculation, and the inability to complete the calculation in real time, super-resolution ultrasound imaging is still only in academic articles or laboratory studies, and has not been put into clinical application.

SUMMARY OF THE INVENTION

A series of concepts of simplified forms are introduced in this Summary, which will be further described in the Detailed Description. The summary here does not imply an attempt to define the key features and essential features of the claimed technical solution, nor does it mean that it attempts to determine the scope of protection of the claimed technical solution.

A super-resolution ultrasonic imaging method provided in accordance with an aspect of the present disclosure may include:

under a normal contrast enhanced mode, transmitting first ultrasonic waves at a first frame rate to a target tissue containing contrast microbubbles, receiving first ultrasonic echo signals of the first ultrasonic waves, and generating and displaying a first contrast enhanced image in real time according to the first ultrasonic echo signals; a contrast microbubble perfusion state reflected by the first contrast enhanced image being used for determining a mode switching time;

switching from the normal contrast enhanced mode to a super-resolution contrast enhanced imaging mode based on the mode switching time, transmitting second ultrasonic waves at a second frame rate to the target tissue, receiving second ultrasonic echo signals of the second ultrasonic waves, and generating and displaying a second contrast enhanced image based on the second ultrasonic echo signals;

when displaying the second contrast enhanced image, performing super-resolution data processing on the second ultrasonic echo signals to obtain a super-resolution image, the super-resolution data processing comprising positioning and tracking of contrast microbubbles within the target tissue so as to generate the super-resolution image based on position information about the contrast microbubbles; and displaying the super-resolution image.

In an embodiment, the second frame rate may be higher than the first frame rate.

In an embodiment, the method may further include: displaying progress of the super-resolution data processing during the super-resolution data processing on the second ultrasonic echo signals.

In an embodiment, the method may further include: performing a quantitative analysis on the super-resolution image, and displaying an analysis result of the quantitative analysis.

In an embodiment, the quantitative analysis of the super-resolution image may include: in response to a received operation instruction to initiate the quantitative analysis, performing the quantitative analysis on the super-resolution image.

In an embodiment, the quantitative analysis of the super-resolution image may include: performing a quantitative analysis on vascular morphological parameters, and/or performing a quantitative analysis on hemodynamic parameters.

In an embodiment, said switching from the normal contrast enhanced mode to a super-resolution contrast enhanced imaging mode based on the mode switching time may include: recognizing the contrast microbubble perfusion state according to the first contrast enhanced image; and determining a time when the recognized contrast microbubble perfusion state meets a predetermined requirement as the mode switching time.

In an embodiment, the method may further include displaying a label representing the super-resolution contrast enhanced imaging mode under the normal contrast enhanced mode; and said switching from the normal contrast enhanced mode to a super-resolution contrast enhanced imaging mode may include: in response to an instruction to select the label representing the super-resolution contrast enhanced imaging mode, switching from the normal contrast enhanced mode to the super-resolution contrast enhanced imaging mode.

In an embodiment, the method may further include: displaying an operation label under the super-resolution contrast enhanced imaging mode after switching from the normal contrast enhanced mode to the super-resolution contrast enhanced imaging mode; and wherein the operation label under the super-resolution contrast enhanced imaging mode comprises at least one of: an operation label for starting and/or ending acquisition of the second ultrasonic echo signals, and an operation label for performing a quantitative analysis on the super-resolution image.

In an embodiment, said displaying the super-resolution image may include: displaying the super-resolution image and other ultrasonic images of the target tissue respectively on a same display interface, wherein the other ultrasonic images comprise at least one of: the second contrast enhanced image, a tissue reference image corresponding to the second contrast enhanced image, a grayscale image and a maximum intensity projection image.

In an embodiment, said displaying the super-resolution image may include: displaying the super-resolution image superimposed on other ultrasonic images of the target tissue, wherein the other ultrasonic images comprise at least one of: the second contrast enhanced image, a tissue reference image corresponding to the second contrast enhanced image, a grayscale image and a maximum intensity projection image.

In an embodiment, the method may further include: adjusting transparency of the super-resolution image in response to a received operation instruction.

In an embodiment, the method may further include: adjusting a display position of the super-resolution image and/or the other ultrasonic images in response to a received operation instruction.

In an embodiment, said generating and displaying a second contrast enhanced image based on the second ultrasonic echo signals may include: extracting partial data frame(s) from the second ultrasonic echo signals, and generating and displaying the second contrast enhanced image according to the partial data frame(s).

In an embodiment, said extracting partial data frame(s) from the second ultrasonic echo signals, and generating and displaying the second contrast enhanced image according to the partial data frame(s) may include: extracting partial video frame(s) according to the first frame rate such that a difference in play frame rate between the first contrast enhanced image and the second contrast enhanced image is less than a predetermined threshold.

In an embodiment, said performing super-resolution data processing on the second ultrasonic echo signals when displaying the second contrast enhanced image may include: freezing the display of the second contrast enhanced image during the super-resolution data processing on the second ultrasonic echo signals.

In an embodiment, the super-resolution image comprises at least one of: a super-resolution density image, a super-resolution velocity image, a super-resolution angle image, and a super-resolution density direction image.

An super-resolution ultrasonic imaging method provided in accordance with a second aspect of the present disclosure may include:
  transmitting ultrasonic waves to a target tissue containing contrast microbubbles and receiving ultrasonic echo signals of the ultrasonic waves;
  generating and displaying a contrast enhanced image based on the ultrasonic echo signals during acquisition of the ultrasonic echo signals;
  when the contrast enhanced image is displayed, performing super-resolution data processing on the ultrasonic echo signals to obtain a super-resolution image, the super-resolution data processing comprising positioning and tracking of contrast microbubbles within the target tissue so as to generate the super-resolution image based on position information about the contrast microbubbles; and
  displaying the super-resolution image.

In an embodiment, the method may further include: display progress of the super-resolution data processing during the super-resolution data processing on the ultrasonic echo signals.

In an embodiment, the method may further include: performing a quantitative analysis on the super-resolution image; and displaying an analysis result of the quantitative analysis.

In an embodiment, said displaying the super-resolution image may include: displaying the super-resolution image and other ultrasonic images of the target tissue respectively on a same display interface, or superimposing the super-resolution image on the other ultrasonic images of the target tissue for displaying; and wherein the other ultrasonic images comprise at least one of: the contrast enhanced image, a tissue reference image corresponding to the contrast enhanced image, a grayscale image, and a maximum intensity projection image.

Said generating and displaying the contrast enhanced image based on the ultrasonic echo signals may include: extracting partial data frame(s) from the ultrasonic echo signals, and generating and displaying the contrast enhanced image in real time according to the partial data frame(s).

An ultrasonic imaging system provided in accordance with a third aspect of the present disclosure may include: an ultrasonic probe comprising a plurality of transducer array elements arranged as a two-dimensional array; a transmitting circuit configured to excite the ultrasonic probe to transmit ultrasonic waves to a target tissue containing contrast microbubbles; a receiving circuit configured to control the ultrasonic probe to receive echoes of the ultrasonic waves to obtain ultrasonic echo signals; a processor configured to perform the super-resolution ultrasonic imaging method mentioned above; and a display configured to display the super-resolution image.

The super-resolution ultrasonic imaging methods and the ultrasonic imaging systems according to the embodiments of the present disclosure can generate and display the second contrast enhanced image when collecting the ultrasonic echo signals used for super-resolution data processing, so that it is convenient for users to observe the current state of microbubble perfusion to enable the users to observe and compare the super-resolution image and the second contrast enhanced image, improving the reliability of super-resolution contrast enhanced imaging results and obtaining more diagnostic information.

BRIEF DESCRIPTION OF THE DRAWINGS

The above and other objects, features and advantages of the present disclosure will become more apparent by describing in detail embodiments thereof with reference to the accompanying drawings. The accompanying drawings are included to provide a further understanding of the embodiments of the present disclosure and constitute a part of this specification, and together with the embodiments of the present disclosure serve to explain the present disclosure and do not constitute a limitation of the present disclosure. In the accompanying drawings, like reference numerals generally refer to like parts or steps.

DETAILED DESCRIPTION

In order to make the objectives, technical solutions, and advantages of the present application clearer, example embodiments according to the present application will be described in detail below with reference to the accompanying drawings. Apparently, the described embodiments are merely some rather than all of the embodiments of the present application. It should be understood that the example embodiments described herein do not constitute any limitation to the present application. All other embodiments derived by those skilled in the art without creative efforts on the basis of the embodiments of the present application described in the present application shall fall within the scope of protection of the present application.

In the following description, a large number of specific details are given to provide a more thorough understanding of the present application. However, it would be understood by those skilled in the art that the present application can be implemented without one or more of these details. In other examples, to avoid confusion with the present application, some technical features known in the art are not described.

It should be understood that the present application can be implemented in different forms and should not be construed as being limited to the embodiments presented herein. On the contrary, these embodiments are provided to make the disclosure thorough and complete, and to fully convey the scope of the present application to those skilled in the art.

The terms used herein are intended only to describe specific embodiments and do not constitute a limitation to the present application. When used herein, the singular forms of "a", "an", and "said/the" are also intended to include plural forms, unless the context clearly indicates otherwise. It should also be appreciated that the terms "comprise" and/or "include", when used in the specification, determine the existence of described features, integers, steps, operations, elements, and/or units, but do not exclude the existence or addition of one or more other features, integers, steps, operations, elements, units, and/or groups thereof. As used herein, the term "and/or" includes any and all combinations of relevant listed items.

For a thorough understanding of the present application, detailed steps and detailed structures will be provided in the following description to explain the technical solutions proposed by the present application. The preferred embodiments of the present application are described in detail as follows. However, in addition to these detailed descriptions, the present application may further have other implementations.

Figure 1:
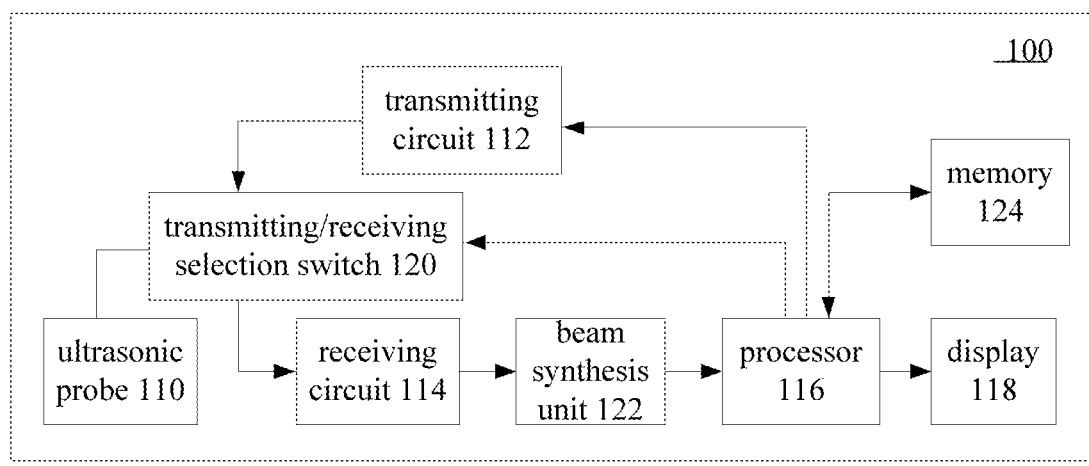
FIG. 1 is a structural block diagram of an ultrasonic imaging system according to an embodiment of the present disclosure.

An ultrasonic imaging system according to an embodiment of the present disclosure is first described with reference to FIG. 1 in the following. FIG. 1 schematically shows a block diagram of the ultrasonic imaging system 100 according to an embodiment of the present disclosure.

As shown in FIG. 1, the ultrasonic imaging system 100 includes an ultrasonic probe 110, a transmitting circuit 112, a receiving circuit 114, a processor 116 and a display 118. Further, the ultrasonic imaging system 100 may also include a transmitting/receiving selection switch 120 and a beam synthesis unit 122. The transmitting circuit 112 and the receiving circuit 114 may connect to the ultrasonic probe 110 via the transmitting/receiving selection switch 120.

The ultrasonic probe 110 may include a plurality of transducer array elements arranged as a two-dimensional array. The plurality of transducer array elements may also form a convex array. The transducer array elements may be used to transmit the ultrasonic waves according to excited electrical signals or to convert received ultrasonic waves into electrical signals. Accordingly, each transducer array element may be used to realize the mutual conversion of electrical pulse signals and ultrasonic waves, thereby achieving transmission of the ultrasonic waves to a tissue in a target region of a tested object, and reception of ultrasonic echo waves reflected by the tissue.

During ultrasonic imaging, it is possible to, via a transmitting sequence and a receiving sequence, control which transducer array elements to transmit the ultrasonic waves and which transducer array elements to receive the ultrasonic waves, or control the transducer array elements to transmit the ultrasonic waves or receive echoes of the ultrasonic waves in time slots. The transducer array elements participating in the transmission of the ultrasonic waves may simultaneously be excited by electrical signals to transmit the ultrasonic waves at the same time; or, the transducer array elements participating in the transmission of the ultrasonic beams may also be excited by several electrical signals with a certain time interval to continuously transmit the ultrasonic waves with a certain time interval.

During ultrasonic imaging, the transmitting circuit 112 may, according to the control of processor 116, generate the transmitting sequence which is used to control part or all of the plurality of transducer array elements to transmit the ultrasonic waves to the target tissue. Parameters of the transmitting sequence may include the number of positions of the transducer array elements used for transmission, and transmission parameters of ultrasonic beams such as amplitude, frequency, number of transmissions, intervals of transmission, transmission angle, wave pattern, focus position, etc. In some cases, the transmitting circuit 112 may also be configured to phase delay transmitted beams to make different transducer array elements to transmit the ultrasonic waves at different times so that each transmitted ultrasonic beam can be focused at a predetermined region of interest. The parameters of the transmitting sequence corresponding to different imaging modes may be different; and after the ultrasonic echo signals may be received via the receiving circuit 114 and then processed by subsequent units and corresponding algorithms, ultrasonic images under different imaging modes may be generated.

The receiving circuit 114 may include one or more amplifiers, analog-to-digital converters, etc. The amplifiers are used to amplify the received ultrasonic echo signals after appropriate gain compensation; and the analogue-to-digital converter are used to sample analog echo signals at a predetermined time interval so as to convert them into digital signals. The echo signals after digitalization may still retain amplitude information, frequency information and phase information. The receiving circuit 114 may send the ultrasonic echo signals to the beam synthesis unit 122 for processing.

The beam synthesis unit 122 may process the ultrasonic echo signals by focusing delay, weighting and channel summation, and then send the processed signals to the processor 116. The processor 116 may perform signal detection, signal enhancement, data conversion and logarithmic compression and other process on the ultrasonic echo signals to form ultrasonic images. The ultrasonic images obtained by the processor 116 may be displayed on the display 118 or may be stored in the memory 124.

Alternatively, the processor 116 may be implemented as software, hardware, firmware, or any combination thereof, and may use a single or multiple application specific integrated circuits (ASIC), a single or more general purpose integrated circuits, a single or more microprocessor processors, a single or more programmable logic devices, or any combination of the preceding circuits and/or devices, or other suitable circuits or devices. Furthermore, the processor 116 may control other components of the ultrasonic imaging system 100 to perform corresponding steps of the methods in various embodiments in this specification.

The display connected to the processor 116 may be a touch display screen, LCD display screen, etc. Alternatively, the display 118 may be an independent display of LCD display, TV set, etc. independent of ultrasonic imaging system 100; or the display 118 may be a display for an electronic device like a smartphone, tablet, etc. The number of the display 118 may be one or more.

The display 118 may display the ultrasonic image obtained by the processor 116. In addition, the display 118 may provide the user with a graphical interface for human-machine interaction while displaying the ultrasonic images. One or more controlled objects may be provided on the graphical interface for the user to use a human-machine interactive unit to input operation instructions to control these controlled objects, so as to perform corresponding control operations. For example, when an icon is displayed on the graphical interface, the icon can be operated by the human-machine interactive unit to perform a specific function, such as drawing a box of a region of interest on the ultrasonic image.

Alternatively, the ultrasonic imaging system 100 may also include other human-machine interactive units besides the display 118, which may be connected to the processor 116. For example, the processor 116 can be connected to the human-machine interactive unit via an external input/output port. The external input/output port may be a wireless communication unit, a wired communication unit, or a combination of the two. The external input/output ports may also be implemented based on USB, bus protocols such as CAN, and/or wired network protocols.

The human-machine interactive unit may include an input unit for detecting user's input information. The input information may be, for example, a control instruction for transmission/reception time sequence of the ultrasonic waves, or an operation input instruction for drawing points, lines or boxes on the ultrasonic image, or other types of instructions. An input device may include one or a combination of a keyboard, a mouse, a scroll wheel, a trackball, a mobile input device (e.g. a mobile device with a touch-sensitive display, a cell phone, etc.), a multi-function knob, etc. The human-machine interactive unit may also include an output device such as a printer.

The ultrasonic imaging system 100 may also include a memory 124 to store instructions executed by the processor, ultrasonic echoes received, ultrasonic images, and so on. The memory may be a flash memory card, a solid state memory, a hard disk, etc. It may be volatile storage and/or non-volatile storage, removable storage and/or non-removable storage, etc.

It should be understood that the parts included in the ultrasonic imaging system 100 shown in FIG. 1 are only schematic, the ultrasonic imaging system can include more or fewer parts. The present disclosure is not limited in this regard.

The super-resolution ultrasonic imaging method according to an embodiment of the present disclosure may be described with reference to FIG. 2 which schematically shows a flowchart of the super-resolution ultrasonic imaging method 200 of an embodiment of the present disclosure.

Figure 2:
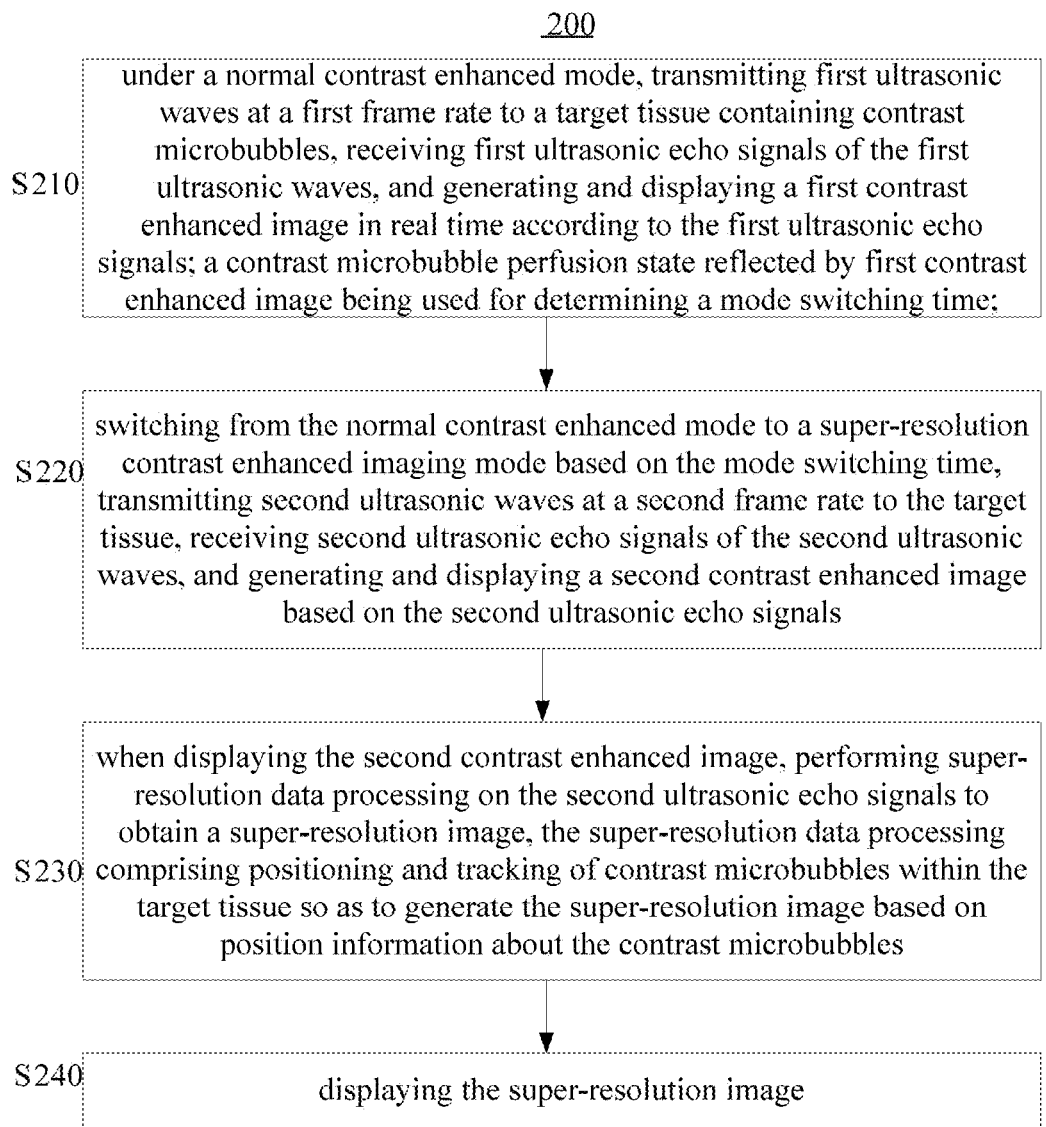
FIG. 2 is a schematic flowchart of a super-resolution ultrasonic imaging method according to an embodiment of the present disclosure.

As shown in FIG. 2, the super-resolution ultrasonic imaging method 200 according to an embodiment of the present disclosure may include the following steps:

Step S210: under a normal contrast enhanced mode, transmitting first ultrasonic waves at a first frame rate to a target tissue containing contrast microbubbles, receiving first ultrasonic echo signals of the first ultrasonic waves, and generating and displaying a first contrast enhanced image in real time according to the first ultrasonic echo signals; a contrast microbubble perfusion state reflected by the first contrast enhanced image being used for determining a mode switching time;

Step S220: switching from the normal contrast enhanced mode to a super-resolution contrast enhanced imaging mode based on the mode switching time, transmitting second ultrasonic waves at a second frame rate to the target tissue, receiving second ultrasonic echo signals of the second ultrasonic waves, and generating and displaying a second contrast enhanced image based on the second ultrasonic echo signals;

Step S230: when displaying the second contrast enhanced image, performing super-resolution data processing on the second ultrasonic echo signals to obtain a super-resolution image, the super-resolution data processing comprising positioning and tracking of contrast microbubbles within the target tissue so as to generate the super-resolution image based on position information about the contrast microbubbles; and Step S240: displaying the super-resolution image.

The super-resolution ultrasonic imaging method 200 according to the embodiment of the present disclosure can generate and display the second contrast enhanced image when collecting the ultrasonic echo signals used for super-resolution data processing, so that it is convenient for users to observe the current state of microbubble perfusion to enable the users to observe and compare the super-resolution image and the second contrast enhanced image, improving the reliability of super-resolution contrast enhanced imaging results and obtaining more diagnostic information.

Specifically, in step S210, the normal contrast enhanced mode is first entered, the first ultrasonic echo signals are obtained at the first frame rate, and the first contrast enhanced image is generated and displayed in real time based on the first ultrasonic echo signals. Exemplarily, before entering the contrast enhanced imaging mode, a grayscale imaging mode can be entered first. After the target tissue is observed under the grayscale imaging mode, the contrast enhanced imaging mode can be started. At this time, a certain dose of pre-configured contrast agent is injected into the patient, and the contrast agent is injected into the target tissue.

Figure 3:
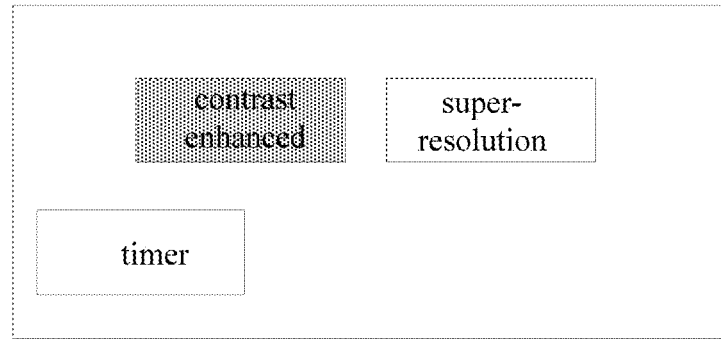
FIG. 3 is a schematic diagram of a display interface under a normal contrast enhanced imaging mode according to an embodiment of the present disclosure.

For example, see FIG. 3, under the contrast enhanced imaging mode, an operation control of a timer can be displayed on the display interface. When injecting a contrast agent, the user clicks the timer and starts backward storage to perform dynamic contrast imaging on a scan section, thus generating contrast enhanced video images. The contrast enhanced video images may include a plurality of frames of first contrast enhanced image.

The contrast agent is a solution containing contrast microbubbles with high echogenicity, i.e. the ability to reflect ultrasonic waves. The gas in contrast microbubbles differs greatly from the echogenicity of human tissue, and therefore a site containing contrast microbubbles can produce ultrasonic images with higher contrast due to high echo differences. Contrast enhanced imaging involves extracting the echo component of the contrast agent in the ultrasonic echo signals and suppressing the echo component of the tissue. Different filters may be used to extract different signal components. The signal component generated by tissue reflection is a linear component in the ultrasonic echo signals, which reflect the characteristics of tissue structure and is referred to as tissue signal; while the signal component obtained by contrast agent reflection is a non-linear component in the ultrasonic echo signals, which reflect the information about contrast agent microbubble and is referred to as contrast signal. Tissue reference image and contrast enhanced image can be obtained by demodulation, envelope seeking and dynamic range transformation of linear and nonlinear components respectively. While displaying the first contrast enhanced image, the tissue reference image can also be displayed on the display interface.

The first contrast enhanced image can reflect the perfusion state of the contrast microbubbles; and the contrast microbubble perfusion state reflected based on the first contrast enhanced image can be used to determine the mode switching time. For example, referring to FIG. 3, under the normal contrast enhanced imaging mode, a label representing the super-resolution contrast enhanced imaging mode may be displayed on the display interface. The user can observe the microbubble perfusion state in the first contrast enhanced image, and select the label representing the super-resolution contrast enhanced imaging mode after determining the time for collection. The ultrasonic imaging system may switch from the normal contrast enhanced imaging mode to the super-resolution contrast enhanced imaging mode in response to an instruction to select the label representing the super-resolution contrast enhanced imaging mode. At this point, the display interface shown in FIG. 3 may be switched to the display interface shown in FIG. 4, and the label representing the super-resolution contrast enhanced imaging mode is differentially displayed to indicate that the super-resolution contrast enhanced imaging mode is currently entered. Furthermore, the display interface may display thereon an operation label under the super-resolution contrast enhanced imaging mode, for example, an operation label used for starting and/or ending acquisition of the second ultrasonic echo signals, and an operation label used for the quantitative analysis of the super-resolution image.

Alternatively, the ultrasonic imaging system may, based on the contrast microbubble perfusion state reflected by the first contrast enhanced image, automatically determine the mode switching time. Specifically, the ultrasonic imaging system may recognize the contrast microbubble perfusion state based on the first contrast enhanced image, and determine the time when the recognized contrast microbubble perfusion state meets a predetermined condition as the mode switching time. For example, the ultrasonic imaging system may continuously monitor the first contrast enhanced image obtained during the perfusion of contrast agent, and determine the time when detecting the contrast microbubbles perfused into the target tissue as the mode switching time. Alternatively, a contrast intensity of the first contrast enhanced image may be detected. When the contrast intensity is higher than a predetermined threshold, it is considered that the contrast microbubble perfusion state meets a requirement and the time thereto correspondingly may be determined as the mode switching time.

In step S220, the contrast enhanced imaging mode is switched from the normal contrast enhanced mode to the super-resolution contrast enhanced imaging mode, and under the super-resolution contrast enhanced imaging mode, the second ultrasonic echo signals are obtained at the second frame rate and the second contrast enhanced image is generated and displayed according to the second ultrasonic echo signals. And in step S230, when displaying the second contrast enhanced image, the second ultrasonic echo signals are performed with super-resolution data processing so as to obtain the super-resolution image. Under the super-resolution contrast enhanced imaging mode, when obtaining the second ultrasonic echo signals for super-resolution data processing, the second contrast enhanced image may be generated and displayed based on the second ultrasonic echo signals, so that it is convenient for the user to observe the current microbubble perfusion state according to the second contrast enhanced image, and the acquisition time of the second ultrasonic echo signals can be determined, improving the reliability of the result of super-resolution contrast imaging.

Preferably, the second frame rate is higher than the first frame rate. The second frame rate may be an extremely high frame rate, for example, which can reach more than 100 frames per second. In order to complete the super-resolution imaging, it is necessary to accumulate enough localization results of the contrast microbubbles. To this end, higher frame rate to collect the second ultrasonic echo signals may be adopted in the embodiment of the disclosure, which can obtain more location results of the contrast microbubbles in a shorter time and then accumulate them to obtain the super-resolution image. Accordingly, the time required for super-resolution imaging is reduced and the time resolution of the super-resolution image is enhanced. In other embodiments, the second frame rate and the first frame rate may also be the same, in which case good results of super-resolution contrast enhanced imaging can be obtained by extending the acquisition time.

Figure 4:
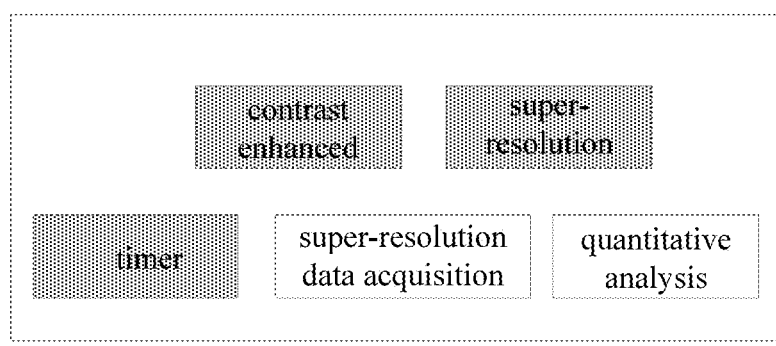
FIG. 4 is a schematic diagram of a display interface under a super-resolution contrast enhanced imaging mode according to an embodiment of the present disclosure.

Exemplarily, the second echo signals can be extracted for super-resolution data processing according to the user's operation instruction. Referring to FIG. 4, under the super-resolution contrast enhanced imaging mode, an operation control for super-resolution data acquisition may be displayed on the display interface. When this operation control is clicked by the user for the first time, it may be lit up and begin to obtain the second ultrasonic echo signals for the super-resolution data acquisition; and when the operation control is clicked again by the user, it may turn dark, which means that the acquisition of the second ultrasonic echo signals for the super-resolution data acquisition is completed; subsequently, the super resolution data processing is started based on the collected second ultrasonic echo signals.

Alternatively, data acquisition for super-resolution imaging may be automatically started or stopped. For example, the data acquisition may be stopped when the acquisition time thereof reaches a preset time. The time required to obtain the second echo signals for super-resolution imaging may be set by the user according to the timer.

Super-resolution data processing may include positioning and tracking of contrast microbubbles within the target tissue, so as to generate the super-resolution image(s) based on the position information about the contrast microbubbles. Exemplarily, the super-resolution data processing may specifically include recognizing and locating the position of each contrast microbubble in each frame of ultrasonic data, and tracking the position changes of the contrast microbubble in different frames of ultrasonic data. Specifically, the position information and signal strength information of the contrast microbubbles in multi-frame ultrasonic data can be determined. Since each contrast microbubble may cover multiple sampling points, the position of the centroid of each contrast microbubble can be used as the position information of each contrast microbubble. By tracking each contrast microbubble in the multi-frame ultrasonic data, the distance and direction of each contrast microbubble can be determined, and then interframe displacement information generated by the microbubble signals in the multi-frame ultrasonic data can be determined.

Based on the position information and signal strength information of the contrast microbubbles, the super-resolution density image reflecting the microvascular morphology and distribution of the target tissue can be obtained. Specifically, the collected signal intensity information can be accumulated according to the corresponding position information to form the super-resolution density image. The super-resolution density image can reflect different density of the contrast microbubbles through different grayscale; alternatively, the density of the contrast microbubbles may be color coded to reflect the density of the contrast microbubbles through color coding.

Alternatively, a microflow velocity image of the imaging target can be obtained according to the interframe displacement information and the second frame rate. Specifically, the ultrasonic imaging apparatus obtains the velocity data of the contrast microbubbles according to the interframe displacement data and the frame rate. After that, a super-resolution velocity image reflecting the blood flow velocity of microvessels can be obtained according to the velocity data, and the blood flow distribution of microvessels can also be observed according to the super-resolution velocity image.

Exemplarily, the velocity information may be color-coded to obtain a super-resolution velocity image. At the same frame rate, the size of interframe displacement of the contrast microbubbles may represent the speed of contrast microbubble movement. The interframe displacement of a single contrast microbubble may be represented by different colors and accumulated to obtain the super-resolution velocity image.

In addition, the super-resolution image obtained from super-resolution data processing may also Include a super-resolution angle image and a super-resolution density direction image. The super-resolution angle image can display velocity direction of micro blood flow, in which different colors may be used to represent different directions. Positive angle may mean blood flow to the ultrasonic probe, while negative angle may mean blood flow away from the ultrasonic probe. The super-resolution density direction image may be regarded as a two-sided-display super-resolution density image, which can simultaneously display the density of the contrast microbubbles and the direction of blood flow. For example, red may indicate flow to the ultrasonic probe (upward flow), and the shade of red may indicate the density of the contrast microbubbles; and blue may indicate away from ultrasonic probe (downward flow), and the shade of blue may indicate the density of the contrast microbubbles.

To be clear, the super-resolution data processing in the embodiment of the disclosure can generate at least one of the super-resolution density image, the super-resolution velocity image, the super-resolution angle image and the super-resolution density direction image. Other forms of the super-resolution image can also be generated by positioning and tracking the contrast microbubbles. Moreover, specific algorithms used for positioning and tracking the contrast microbubbles and for generating the super-resolution image based on the result of positioning and tracking are not limited herein.

The super-resolution data processing mainly includes positioning and tracking the contrast microbubbles in the multi-frame ultrasonic data, which leads to a relatively long processing time; therefore during the super-resolution data processing on the second ultrasonic echo signals, the progress of the super-resolution data processing may also be displayed on the display interface to remind the user of the remaining processing time. For example, the progress of the super-resolution data processing may be displayed as a progress bar, or in percentage form or any other appropriate manner.

According to the embodiment of the present disclosure, during the super-resolution data processing of the second ultrasonic echo signals, the second contrast enhanced image may be generated and displayed according to the second ultrasonic echo signals. The way to generate the second contrast enhanced image is the same as the way to generate the first contrast enhanced image, that is, the second contrast enhanced image can be obtained by extracting non-linear scattered signals generated by the contrast microbubbles, detailed description thereof may refer to the above and not be repeated here. Alternatively, when generating the second contrast enhanced image, tissue linear scattered signals may also be extracted from the second ultrasonic echo signals to generate the tissue reference image corresponding to the second contrast enhanced image.

Since the amount of data required by conventional contrast enhanced imaging is less than that of the contrast enhanced super-resolution imaging, when the second frame rate is higher than the first frame rate, frame extraction may be adopted to generate the second contrast enhanced image; that is, partial data frame(s) may be extracted from the second ultrasonic echo signals, and the second contrast enhanced image is generated and displayed based on the extracted partial data frame(s), avoiding wasting too much computing resources.

Furthermore, when extracting the partial data frame(s) from the second ultrasonic echo signals, partial video frame(s) may be extracted from the second ultrasonic echo signals according to the first frame rate, making the imaging frame rates thereof correlation.

Furthermore, when extracting the partial data frame(s) from the second ultrasonic echo signals, partial video frame(s) may be extracted from the second ultrasonic echo signals according to the first frame rate, such that the difference in play frame rate between the first contrast enhanced image and the second contrast enhanced image is less than a predetermined threshold, for example, the play frame rates of the two are the same or have a small difference, making the visual effects of the first contrast enhanced image and the second contrast enhanced image more smoother during the switch from the normal contrast enhanced mode to the super-resolution contrast enhanced imaging mode.

Alternatively, when extracting the partial data frame(s) from the second ultrasonic echo signals to generate the second contrast enhanced image, the frame rate of the second contrast enhanced image is smaller than the frame rate of the first contrast enhanced image so that the computing resources required for generating the second contrast enhanced image can be reduced. Furthermore, during the super-resolution data processing on the second ultrasonic echo signals, it may also freeze the display of the second contrast enhanced image instead of generating and displaying the second contrast enhanced image in real time, so that more computing resources are devoted to the super-resolution data processing and the time of the super-resolution data processing is shortened.

After the super-resolution image is generated, it is displayed in step S240. As mentioned above, the super-resolution image may include the super-resolution density image, the super-resolution velocity image, etc. Such multiple kinds of the super-resolution images may be displayed simultaneously; or part of the super-resolution images may be chosen for displaying based on a received selection instruction inputted by the user. Alternatively, the selection of the super-resolution image by the user may be performed prior to the super-resolution data processing so as to reduce unnecessary computation.

Exemplarily, when displaying the super-resolution image, the super-resolution image may be play in a loop, that is, dynamically display the generation process of the super-resolution image, so that the perfusion state of the contrast microbubbles can be observed by users in real time. Super-resolution contrast enhanced imaging is to locate and track isolated contrast microbubble and perform accumulation along the time dimension, therefore play in a loop manner may repeatedly present the generation process of microvessels from sparse to dense, as well as the arrival sequence of the microbubbles. When displaying multiple kinds of the super-resolution images, multiple super-resolutions may be displayed in the time dimension in alignment or in sequence.

When displaying the super-resolution image, other ultrasonic images of the target tissue may also be displayed simultaneously. The other ultrasonic images of the target tissue may include at least one of: the second contrast enhanced image generated simultaneously with the super-resolution image, the tissue reference image corresponding to the second contrast enhanced image, the grayscale image and the maximum intensity projection image. The grayscale image may also be referred to as B image, and the displayed grayscale image may be the grayscale image of the target tissue that is generated under greyscale imaging mode before entered into the contrast enhanced imaging mode. The maximum intensity projection image is an image obtained by comparing the current contrast enhanced image with the previous multi-frame contrast enhanced images, remaining the maximum pixel value of the multi-frame contrast enhanced images for each pixel point, and displaying it in the current contrast enhanced image; and the advantage thereof is that it can record and visualize the flow path of contrast microbubbles in the tiny blood vessel within a period of time to visualize the structure of the tiny blood vessel. The other ultrasonic images of the target tissue may also include the first contrast enhanced image. By displaying multiple ultrasonic images on the same screen, various ultrasonic image can complement each other, making up for the limitations of a single ultrasonic image, and providing all-round and multi-angle information of the target tissue.

When displaying the super-resolution image and the other ultrasonic images on the same screen, the super-resolution image and the other ultrasonic images of the target tissue may be displayed on the same display interface respectively, without hybrid superposition processing therebetween. Alternatively, the super-resolution image may also be superimposed and displayed on the other ultrasonic images of the target tissue, which is similar to color blood flow image superimposed on the tissue structure image for displaying.

Figure 5:
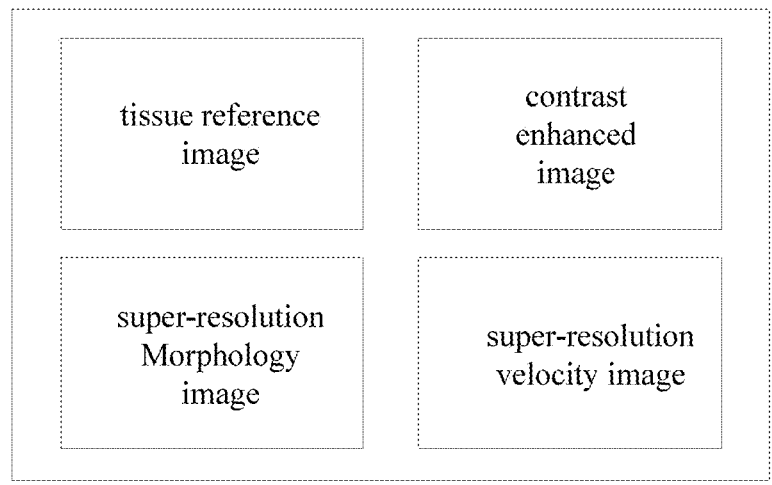
FIG. 5 is a schematic diagram of displaying a super-resolution image and other ultrasonic images respectively according to an embodiment of the present disclosure.

Referring to FIG. 5, when using mutually independent display modes, the super-resolution image and the other ultrasonic images of the target tissue may be simultaneously display in a tiled form, without mixing and superposition therebetween. Independent display results are more flexible, allowing users to freely choose the ultrasonic image to be displayed. In addition, the position, number, size, etc. of the ultrasonic images displayed on the display interface may allow users to freely adjust, and the position, number, size, etc. of the display of the super-resolution image and/or the other ultrasonic images may be adjusted in response to a received operation instruction.

Figure 6:
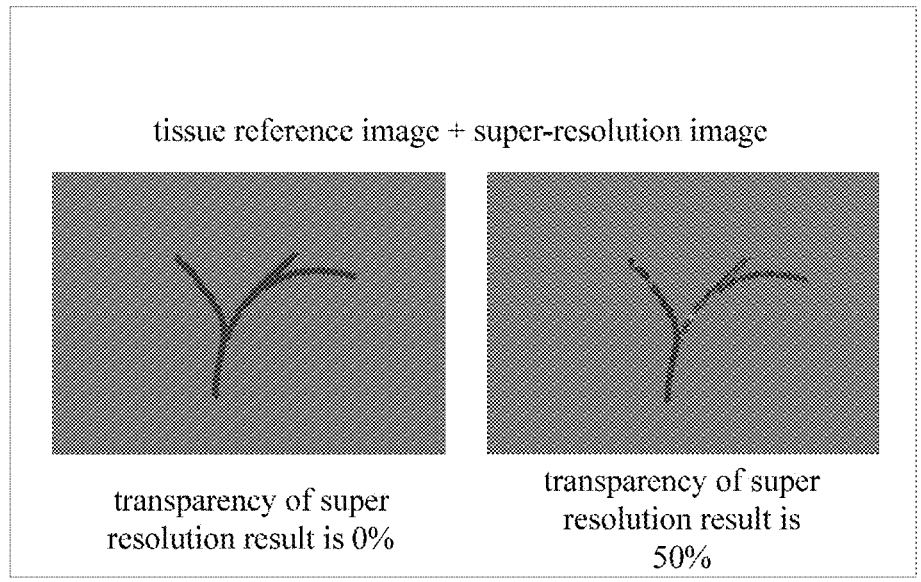
FIG. 6 is a schematic diagram of displaying a super-resolution image and a tissue reference image in a superimposed manner according to an embodiment of the present disclosure.

Referring to FIG. 6, when superimposed display is adopted, the super-resolution image may be superimposed on the other ultrasonic images in a semitransparent manner. The transparency of the super-resolution image can be adjusted. The transparency of the super-resolution image can be adjusted in response to the received operation instruction. Users can freely select ultrasonic images for superposition with the super-resolution image through operation controls on the display interface, and adjust the position, quantity and size of the ultrasonic images displayed on the display interface.

Further, after obtaining the super-resolution image, the quantitative analysis may also be performed on the super-resolution image and the results of the quantitative analysis may be displayed. As mentioned above, under the super-resolution contrast enhanced imaging mode, an operation label for quantitative analysis of the super-resolution image may be displayed on the display interface, by which an operation instruction to start quantitative analysis may be received. In response to the received operation instruction to start quantitative analysis, quantitative analysis is performed on the super-resolution image and the quantitative analysis results may be presented, assisting users in diagnosis.

Exemplarily, the quantitative analysis of the super-resolution image may include: quantitative analysis of vascular morphological parameters, or quantitative analysis of hemodynamic parameters. The vascular morphological parameters may include vessel diameter, vessel density, vessel tortuosity, etc. The hemodynamic parameters may include average blood flow velocity, blood flow, etc. For example, the super-resolution image may be performed with image recognition and segmentation to obtain vascular morphological parameters such as vessel diameter, vessel density, vessel tortuosity and the like. The hemodynamic parameters including blood flow velocity and blood flow can be obtained from the motion velocity of microbubbles. Specific algorithms of quantitative analysis do not limit in the embodiments of the present disclosure.

Having said all of above, the super-resolution ultrasonic imaging method 200 according to the embodiment of the present disclosure can generate and display the second contrast enhanced image when collecting the ultrasonic echo signals used for super-resolution data processing, so that it is convenient for users to observe the current state of microbubble perfusion to enable the users to observe and compare the super-resolution image and the second contrast enhanced image, improving the reliability of super-resolution contrast enhanced imaging results and obtaining more diagnostic information.

The super-resolution ultrasonic imaging method according to an embodiment of the present disclosure may be described with reference to FIG. 7 which schematically shows a flowchart of the super-resolution ultrasonic imaging method 700 of an embodiment of the present disclosure.

Figure 7:
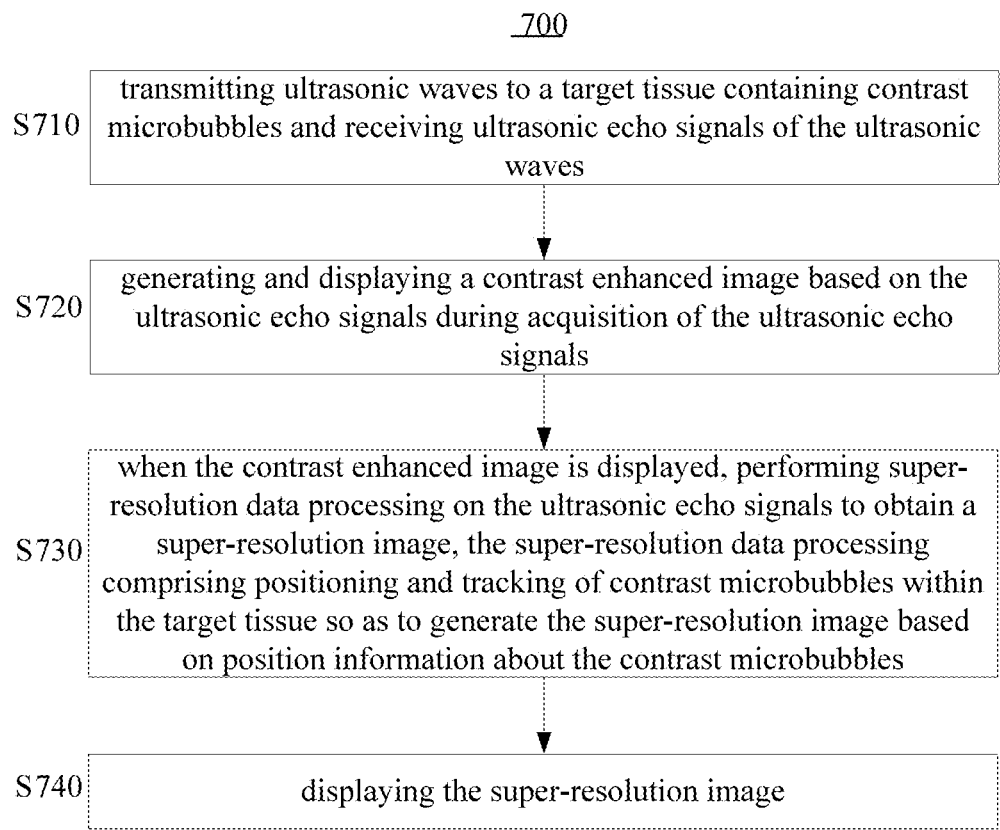
FIG. 7 is a schematic flowchart of a super-resolution ultrasonic imaging method according to another embodiment of the present disclosure.

As shown in FIG. 7, the super-resolution ultrasonic imaging method 700 according to an embodiment of the present disclosure may include the following steps:

Step S710: transmitting ultrasonic waves to a target tissue containing contrast microbubbles and receiving ultrasonic echo signals of the ultrasonic waves;

Step S720: generating and displaying a contrast enhanced image based on the ultrasonic echo signals during acquisition of the ultrasonic echo signals;

Step S730: when the contrast enhanced image is displayed, performing super-resolution data processing on the ultrasonic echo signals to obtain a super-resolution image, the super-resolution data processing comprising positioning and tracking of contrast microbubbles within the target tissue so as to generate the super-resolution image based on position information about the contrast microbubbles; and Step S740: displaying the super-resolution image.

Figure 8:
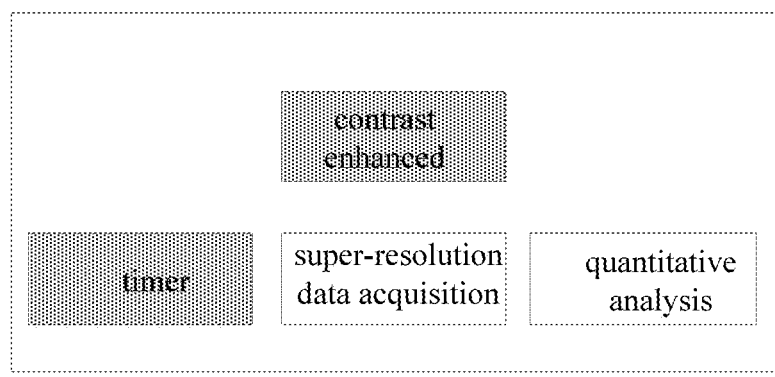
FIG. 8 is a schematic diagram of a display interface under a contrast enhanced imaging mode according to another embodiment of the present disclosure.

Similar to the super-resolution ultrasonic imaging method 200, the super-resolution ultrasonic imaging method 700 may generate and display the contrast enhanced image when performing super-resolution data processing based on the ultrasonic echo signals, so that the user can observe the perfusion state of the contrast microbubbles based on the contrast enhanced image. Exemplarily, referring to FIG. 8, the user may select to start data acquisition for super-resolution contrast imaging under the contrast enhanced imaging mode. After the acquisition of data has been completed, the super-resolution data processing may be started and the contrast enhanced image may be displayed simultaneously, without switching to the contrast enhanced imaging mode based on the contrast microbubble perfusion state reflected by the first contrast enhanced image as mentioned in the super-resolution ultrasonic imaging method 200. In addition, many of the specific details of the super-resolution ultrasonic imaging method 200 described above can be applied to the ultrasonic imaging system in the super-resolution ultrasonic imaging method 700.

Exemplarily, when generating and displaying the contrast enhanced image in real time according to the ultrasonic echo signals, frame extraction may be adopted, that is partial data frame(s) may be extracted from the ultrasonic echo signals, and the contrast enhanced image may be generated and displayed in real time according to the partial data frame(s).

Exemplarily, during the super-resolution data processing of the ultrasonic echo signals, the progress of the super-resolution data processing may be displayed on the display interface. After finishing the super-resolution data processing, the super-resolution image may be quantitatively analyzed, and the analysis result of the quantitative analysis may be displayed. The quantitative analysis may be started in response to an operation instruction to initiate the quantitative analysis, or be directly performed after finishing data processing.

Exemplarily, when displaying the super-resolution image, the super-resolution image and other ultrasonic images of the target tissue may be displayed respectively on the same display interface, or it may display the super-resolution image superimposed onto the other ultrasonic images of the target tissue. The super-resolution image may include at least one of: a super-resolution density image, a super-resolution velocity image, a super-resolution angle image and a super-resolution density direction image; and the other ultrasonic images may include at least one of: the contrast enhanced image, the tissue reference image corresponding to the contrast enhanced image, the grayscale image, and the maximum intensity projection image.

The super-resolution ultrasonic imaging method 700 according to the embodiment of the present disclosure can generate and display the contrast enhanced image when collecting the ultrasonic echo signals used for super-resolution data processing, so that it is convenient for users to observe the current state of microbubble perfusion to enable the users to observe and compare the super-resolution image and the contrast enhanced image, improving the reliability of super-resolution contrast enhanced imaging results and obtaining more diagnostic information.

An ultrasonic imaging system for implementing the aforesaid super-resolution ultrasonic imaging method 200 or 700 may also be provided according to an embodiment of the present disclosure. Referring back to FIG. 1, the ultrasonic imaging system may be implemented as the ultrasonic imaging system 100 shown in FIG. 1. The ultrasonic imaging system 100 may include the ultrasonic probe 110, the transmitting circuit 112, the receiving circuit 114, the processor 116 and the display 118. Optionally, the ultrasonic imaging system 100 may also include the transmitting/receiving selection switch 120 and the beam synthesis unit 122. The transmitting circuit 112 and the receiving circuit 114 may connect to the ultrasonic probe 110 via the transmitting/receiving selection switch 120. The relevant description of each component can refer to the relevant description above, which will not repeat it here.

The above only describes the main functions of each component of the ultrasonic imaging system. See the related descriptions for super-resolution ultrasonic imaging method 200 and super-resolution ultrasonic imaging method 700 for more details. The ultrasonic imaging system according to the embodiments of the present disclosure can generate and display the contrast enhanced image when collecting the ultrasonic echo signals used for super-resolution data processing, so that it is convenient for users to observe the current state of microbubble perfusion to enable the users to observe and compare the super-resolution image and the contrast enhanced image, improving the reliability of super-resolution contrast enhanced imaging results and obtaining more diagnostic information.

While example embodiments have been described herein with reference to the accompanying drawings, it should be understood that the above example embodiments are merely illustrative and are not intended to limit the scope of the disclosure thereto. Those of ordinary skill in the art may make various changes and modifications therein without departing from the scope and spirit of the disclosure. All such changes and modifications are intended to be included in the scope of the disclosure as claimed in the appended claims.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraint conditions of the technical solutions. Those skilled in the art could use different methods to implement the described functions for each particular application, but such implementation should not be considered to be beyond the scope of the disclosure.

In several embodiments provided in the present application, it should be understood that the disclosed devices and methods may be implemented in other ways. For example, the device embodiments described above are merely exemplary. For example, the division of units is merely a logical function division. In actual implementations, there may be other division methods. For example, a plurality of units or components may be combined or integrated into another device, or some features may be omitted or not implemented.

A large number of specific details are explained in this specification provided herein. However, it can be understood that the embodiments of the disclosure can be practiced without these specific details. In some instances, well-known methods, structures, and technologies are not shown in detail, so as not to obscure the understanding of this description.

Similarly, it should be understood that in order to simplify the disclosure and help to understand one or more of various aspects of the disclosure, in the description of the exemplary embodiments of the disclosure, various features of the disclosure are sometimes together grouped into an individual embodiment, figure or description thereof. However, the method of the disclosure should not be construed as reflecting the following intention: namely, the disclosure set forth requires more features than those explicitly stated in each claim. More precisely, as reflected by the corresponding claims, the inventive point thereof lies in that features that are fewer than all the features of an individual embodiment disclosed may be used to solve the corresponding technical problem. Therefore, the claims in accordance with the particular embodiments are thereby explicitly incorporated into the particular embodiments, wherein each claim itself serves as an individual embodiment of the disclosure.

Those skilled in the art should understand that, in addition to the case where features are mutually exclusive, any combination may be used to combine all the features disclosed in this specification (along with the appended claims, abstract, and drawings) and all the processes or units of any of methods or devices as disclosed. Unless explicitly stated otherwise, each feature disclosed in this specification (along with the appended claims, abstract, and drawings) may be replaced by an alternative feature that provides the same, equivalent, or similar object.

Furthermore, those skilled in the art should understand that although some of the embodiments described herein comprise some but not other features included in other embodiments, combinations of features of different embodiments are meant to be within the scope of the disclosure, and form different embodiments. For example, in the claims, any one of the embodiments set forth thereby can be used in any combination.

Various embodiments regarding components in the disclosure may be implemented in hardware, or implemented by software modules running on one or more processors, or implemented in a combination thereof. It should be understood for those skilled in the art that a microprocessor or a digital signal processor (DSP) may be used in practice to implement some or all of the functions of some modules according to the embodiments of the disclosure. The disclosure may further be implemented as an apparatus program (e.g. a computer program and a computer program product) for executing some or all of the methods described herein. Such a program for implementing the disclosure may be stored on a computer-readable medium, or may be in the form of one or more signals. Such signals may be downloaded from an Internet website, or provided on a carrier signal, or provided in any other form.

It should be noted that the description of the disclosure made in the above-mentioned embodiments is not to limit the disclosure, and those skilled in the art may design alternative embodiments without departing from the scope of the appended claims. In the claims, any reference signs placed between parentheses should not be construed as limitation on the claims. The disclosure may be implemented by means of hardware comprising several different elements and by means of an appropriately programmed computer. In component claims listing several apparatuses, several of these apparatuses may be specifically embodied by one and the same item of hardware. The use of the terms "first", "second", "third", etc. does not indicate any order. These terms may be interpreted as names.

The above is only the specific embodiment of the present disclosure or the description of the specific embodiment, and the protection scope of the present disclosure is not limited thereto. Any changes or substitutions should be included within the protection scope of the present disclosure. The protection scope of the present disclosure shall be subject to the protection scope of the claims.

The invention claimed is:

1. An ultrasonic imaging method, comprising:
under a normal contrast enhanced mode, transmitting first ultrasonic waves at a first frame rate to a target tissue containing contrast microbubbles, receiving first ultrasonic echo signals of the first ultrasonic waves, and generating and displaying a first contrast enhanced image in real time according to the first ultrasonic echo signals; a contrast microbubble perfusion state reflected by the first contrast enhanced image being used for determining a mode switching time;
switching from the normal contrast enhanced mode to a super-resolution contrast enhanced imaging mode based on the mode switching time, transmitting second ultrasonic waves at a second frame rate to the target tissue, receiving second ultrasonic echo signals of the second ultrasonic waves, and generating and displaying a second contrast enhanced image based on the second ultrasonic echo signals;
when displaying the second contrast enhanced image, performing super-resolution data processing on the second ultrasonic echo signals to obtain a super-resolution image, the super-resolution data processing comprising positioning and tracking of the contrast microbubbles within the target tissue so as to generate the super-resolution image based on position information about the contrast microbubbles;
displaying the super-resolution image; and
displaying a label representing the super-resolution contrast enhanced imaging mode under the normal contrast enhanced mode,
wherein the switching from the normal contrast enhanced mode to the super-resolution contrast enhanced imaging mode is performed in response to an instruction to select the label representing the super-resolution contrast enhanced imaging mode.

2. The ultrasonic imaging method according to claim 1, wherein the second frame rate is higher than the first frame rate.

3. The ultrasonic imaging method according to claim 1, further comprising:

displaying progress of the super-resolution data processing during the super-resolution data processing on the second ultrasonic echo signals.

4. The ultrasonic imaging method according to claim 1, further comprising:
performing a quantitative analysis on the super-resolution image, and displaying an analysis result of the quantitative analysis.

5. The ultrasonic imaging method according to claim 4, wherein the quantitative analysis of the super-resolution image comprises:
performing a quantitative analysis on vascular morphological parameters, and/or performing a quantitative analysis on hemodynamic parameters.

6. The ultrasonic imaging method according to claim 1, wherein said switching from the normal contrast enhanced mode to a super-resolution contrast enhanced imaging mode based on the mode switching time comprises:
recognizing the contrast microbubble perfusion state according to the first contrast enhanced image; and
determining a time when the recognized contrast microbubble perfusion state meets a predetermined requirement as the mode switching time.

7. The ultrasonic imaging method according to claim 1, further comprising displaying an operation label under the super-resolution contrast enhanced imaging mode after switching from the normal contrast enhanced mode to the super-resolution contrast enhanced imaging mode; and
wherein the operation label under the super-resolution contrast enhanced imaging mode comprises at least one of: an operation label for starting and/or ending acquisition of the second ultrasonic echo signals, and an operation label for performing a quantitative analysis on the super-resolution image.

8. The ultrasonic imaging method according to claim 1, wherein said displaying the super-resolution image comprises:
displaying the super-resolution image and other ultrasonic images of the target tissue respectively on a same display interface, wherein the other ultrasonic images comprise at least one of: the second contrast enhanced image, a tissue reference image corresponding to the second contrast enhanced image, a grayscale image and a maximum intensity projection image.

9. The ultrasonic imaging method according to claim 1, wherein said displaying the super-resolution image comprises:
displaying the super-resolution image superimposed on other ultrasonic images of the target tissue, wherein the other ultrasonic images comprise at least one of: the second contrast enhanced image, a tissue reference image corresponding to the second contrast enhanced image, a grayscale image and a maximum intensity projection image.

10. The ultrasonic imaging method according to claim 9, further comprising: adjusting transparency of the super-resolution image in response to a received operation instruction.

11. The ultrasonic imaging method according to claim 1, wherein said generating and displaying a second contrast enhanced image based on the second ultrasonic echo signals comprises:
extracting one or more partial data frames from the second ultrasonic echo signals, and generating and displaying the second contrast enhanced image according to the one or more partial data frames.

12. The ultrasonic imaging method according to claim 11, wherein said extracting one or more partial data frames from the second ultrasonic echo signals, and generating and displaying the second contrast enhanced image according to the one or more partial data frames comprises:
extracting one or more partial video frames according to the first frame rate such that a difference in play frame rate between the first contrast enhanced image and the second contrast enhanced image is less than a predetermined threshold.

13. The ultrasonic imaging method according to claim 1, wherein said performing super-resolution data processing on the second ultrasonic echo signals when displaying the second contrast enhanced image comprises:
freezing the display of the second contrast enhanced image during the super-resolution data processing on the second ultrasonic echo signals.

14. The ultrasonic imaging method according to claim 1, wherein the super-resolution image comprises at least one of: a super-resolution density image, a super-resolution velocity image, a super-resolution angle image, and a super-resolution density direction image.

15. An ultrasonic imaging method, comprising:
transmitting ultrasonic waves to a target tissue containing contrast microbubbles and receiving ultrasonic echo signals of the ultrasonic waves;
generating and displaying a contrast enhanced image in real time based on the ultrasonic echo signals during acquisition of the ultrasonic echo signals;
when the contrast enhanced image is displayed, performing super-resolution data processing on the ultrasonic echo signals to obtain a super-resolution image, the super-resolution data processing comprising positioning and tracking of the contrast microbubbles within the target tissue so as to generate the super-resolution image based on position information about the contrast microbubbles; and
displaying the super-resolution image,
wherein the displaying of the super-resolution image comprises displaying the super-resolution image and other ultrasonic images of the target tissue respectively on a same display interface, or superimposing the super-resolution image on the other ultrasonic images of the target tissue for displaying, wherein the other ultrasonic images comprise at least one of: the contrast enhanced image, a tissue reference image corresponding to the contrast enhanced image, a grayscale image, or a maximum intensity projection image.

16. The ultrasonic imaging method according to claim 15, further comprising:
performing a quantitative analysis on the super-resolution image; and displaying an analysis result of the quantitative analysis.

17. The ultrasonic imaging method according to claim 15, wherein said generating and displaying the contrast enhanced image in real time based on the ultrasonic echo signals comprises:
extracting one or more partial data frames from the ultrasonic echo signals, and generating and displaying the contrast enhanced image in real time according to the one or more partial data frames.

18. An ultrasonic imaging system, comprising:
an ultrasonic probe comprising a plurality of transducer array elements arranged as a two-dimensional array;
a transmitting circuit configured to excite the ultrasonic probe to transmit ultrasonic waves to a target tissue containing contrast microbubbles;

a receiving circuit configured to control the ultrasonic probe to receive echoes of the ultrasonic waves to obtain ultrasonic echo signals;

a display; and a processor configured to:

under a normal contrast enhanced mode, control the transmitting circuit to transmit first ultrasonic waves at a first frame rate to the target tissue containing contrast microbubbles, control the receiving circuit to receive first ultrasonic echo signals of the first ultrasonic waves, and generate a first contrast enhanced image in real time according to the first ultrasonic echo signals; and control the display to display the first contrast enhanced image, a contrast microbubble perfusion state reflected by the first contrast enhanced image being used for determining a mode switching time;

switch from the normal contrast enhanced mode to a super-resolution contrast enhanced imaging mode based on the mode switching time, control the transmitting circuit to transmit second ultrasonic waves at a second frame rate to the target tissue, control the receiving circuit to receive second ultrasonic echo signals of the second ultrasonic waves, and generate a second contrast enhanced image based on the second ultrasonic echo signals; and control the display to display the second contrast enhanced image;

when controlling the display to display the second contrast enhanced image, perform super-resolution data processing on the second ultrasonic echo signals to obtain a super-resolution image, the super-resolution data processing comprising positioning and tracking of contrast microbubbles within the target tissue so as to generate the super-resolution image based on position information about the contrast microbubbles;

control the display to display the super-resolution image; and control the display to display a label representing the super-resolution contrast enhanced imaging mode under the normal contrast enhanced mode, wherein the switching from the normal contrast enhanced mode to the super-resolution contrast enhanced imaging mode is performed in response to an instruction to select the label representing the super-resolution contrast enhanced imaging mode.

* * * * *